United States Patent [19]

Terrell

[11] 4,224,515
[45] Sep. 23, 1980

[54] HIGH ACCURACY OPTICAL SHAFT ENCODER SYSTEM

[75] Inventor: Mark C. Terrell, Burlington, Mass.

[73] Assignee: The United States of America as represented by the Secretary of the Air Force, Washington, D.C.

[21] Appl. No.: 955,295

[22] Filed: Oct. 27, 1978

[51] Int. Cl.² .............................................. G01D 5/34
[52] U.S. Cl. .............................. 250/231 SE; 318/640
[58] Field of Search ...................... 324/175, 161, 166; 250/231 SE; 340/347 P; 318/640

[56] References Cited

U.S. PATENT DOCUMENTS 3,706,048  12/1972  Johnston .............................. 324/161

Primary Examiner—David C. Nelms
Assistant Examiner—Darwin R. Hostetter
Attorney, Agent, or Firm—Joseph E. Rusz; Henry S. Miller, Jr.

[57] ABSTRACT

An optical shaft encoder system for measuring electrically powered motor shaft speed, including a system for increasing the sinosoidal encoder output waveforms by a multiplication factor, converting the product of the multiplied waveforms to square waves, comparing the waveforms to a reference waveform and generating a correction signal which is fed back to the motor through servo circuitry, thereby correcting errors in motor shaft rotational speed.

4 Claims, 2 Drawing Figures

HIGH ACCURACY OPTICAL SHAFT ENCODER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a system for controlling motor speed and more particularly, to a system for accurately controlling high speed optical shafts.

Although this invention may be used for speed control of any rotating shaft, it has been shown to have particular application in high speed cameras.

High speed cameras operate on a principal of rapidly passing the film past an aperture for exposure rather than utilizing a conventional shutter mechanism. Film thus moving requires precisely controlled motors for driving the various parts including take up rolls. These motors have shafts which turn on the order of 250 revolutions per second and have absolute minimum deviation from this speed.

Typically, an optical shaft encoder is connected to the shaft for measuring deviation in speed. The optical shaft encoder consists of a photographic fixed mask and a corresponding rotating disk attached to the shaft. The mask consists of alternating transparent and opaque areas. Light is directed through the photographic mask and the rotating disk which forms a Miore interference pattern which is then detected into an appropriate photo sensor, generating an electrical sine wave as output.

In the past, in an effort to increase the accuracy of such a system, the improvement has been directed toward the photographic mask. Increasing the number of transparent areas increases the sampling and hence the quantity of sine waves as output. However, there are two major drawbacks to this approach; first, such masks are very expensive to manufacture. Second, they are limited by the nature of the art as to how many alternating areas they can accommodate.

Hence, a new and improved system for measuring and controlling shaft speed is needed which does not include attempting to redesign or further modify existing mask structures. Utilizing a conventional relatively inexpensive mask and optical shaft encoder, the invention presented hereinafter utilizes an improved electronic system to enhance the capabilities of the encoder for motor shaft speed control.

SUMMARY OF THE INVENTION

The invention utilizes a new and improved electronic circuit in combination with a conventional, relatively inexpensive optical shaft encoder to provide a highly sensitive and accurate correction signal for the shaft motor.

The circuit of the system receives the sine wave output signal from the optical shaft encoder and increases the waveform from the impulse of 250 cycles per shaft revolution to 25,000 cycles per shaft revolution. The invention functions on the very simple proposition that an increase in the sampling rate will increase the accuracy of the sample. The sinusoidal information is electronically shaped to yield a logical output with transitions at the sinusoidal zero crossing points. Prior art circuits were limited to the cycles per shaft revolution, since no position information is available between logical transitions. However, the sinusoidal waveform contained continuous positional information and extremely high accuracy is obtainable by making use of the relationship $Cos^2 \theta \alpha Cos 2\theta$. Theoretically, infinite positional accuracy is obtainable by successively squaring the waveform to $10^{nth}$. As a practical approach, the waveform will be squared only as needed in the particular system.

The output from the series squaring circuits, also known as dual in line packages, is fed to logic conversion circuit. In this circuit a technique referred to as zero crossing detection converts the sine wave to a logical square wave. This change is from the analog to binary and produces a logical 1 for a plus voltage and 0 for minus voltage.

The logical square wave is then compared to a separate reference square wave where the resultant error correction voltage is generated. This error correction voltage is then fed back to the motor to correct any variations in speed that might arise.

It is therefore an object of the invention to provide a new and improved optical shaft encoder system.

It is another object of the invention to provide a new and improved optical shaft encoder system that is more accurate than any similar like system.

It is a further object of the invention to provide a new and improved optical shaft encoder system that is low in cost.

It is still another object of the invention to provide a new and improved optical shaft encoder system that operates with a high degree of reliability.

It is still a further object of the invention to provide a new and improved optical shaft encoder-speed control system that operates with a short response time.

It is another object of the invention to provide a new and improved optical shaft encoder-speed control system that is relatively small and light in weight and can be utilized with rotating shafts of a variety of sizes.

These and other objects, features and advantages will become more apparent from the following description taken in connection with the illustrative embodiment in the accompanying drawing.

DESCRIPTION OF THE PREFERRED EMBODIMENT

Figure 1:
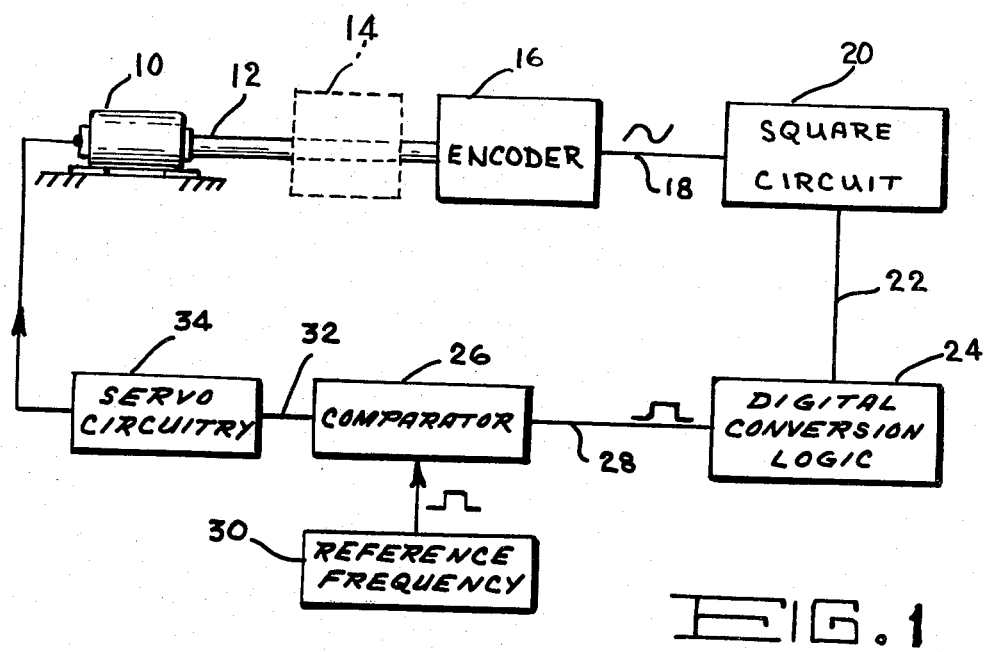
FIG. 1 is a block diagram of the system of the invention.

Referring now to FIG. 1, there is shown an electric motor 10 having a shaft 12 extending through an operative device, such as a camera 14. An optical shaft encoder 16 is operatively connected to the end of the shaft 12. The optical shaft encoder produces an electrical output as will be explained hereinafter.

The output from the encoder 16 has a sinusoidal waveform, and is described in cycles per shaft revolution. The sinusoidal output waveform will, in general, not exceed 250 cycles per shaft revolution. This signal is passed via line 18 to a squaring circuit 20. Squaring circuit 20 consists of a plurality of integrated multiplying circuits which square the waveform according to sine $\theta^2 \alpha 2$ Sine $\theta$. The squaring of the waveform increases the accuracy of the system. For example if the waveforms were squared to 25,000 cycles per shaft revolution, the accuracy would increase by a factor of $10^2$.

Once the number of sinusoidal wave forms has been increased by the mulitplication process, the output signal is fed via line 22 to a digital conversion logic 24. The digital conversion logic converts the analog sine-wave form to a square waveform providing a logical digital output of 1 and 0 at the high and low points of the sine wave. The square wave form is then fed to a comparator 26 via line 28 where the signal is compared with a reference signal from the reference frequency generator 30. The output from the comparator is fed via line 32 to servo circuitry 34 where a correction voltage is generated and sent to the motor, thereby controlling the speed of the output shaft.

Figure 2:
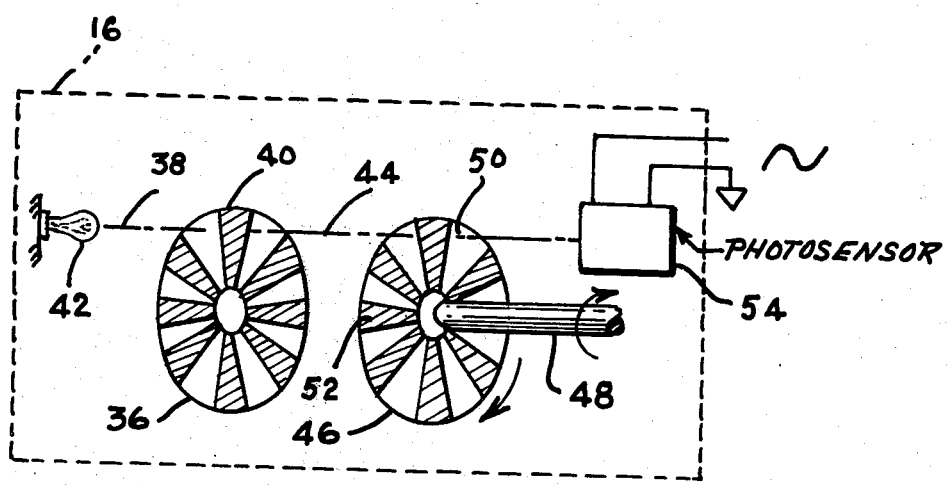
FIG. 2 is a schematic representation of a typical optical encoder.

FIG. 2 shows in schematic form the details of the optical encoder. Within the housing 16 is a stationary photographic mask 39 having appropriately designed light transparent (38) and opaque (40) areas. A source of illumination, such as a light bulb 42 focuses a light beam 44 through the mask and also through the disk 46. Disk 46 is affixed to the rotating shaft 48 and turns therewith. This disk, like the photographic mask 36, has alternating light transparent and opaque areas 50 and 52 respectively. Light beam 44 then passes to the photo sensor 54 when two transparent areas are in alignment and causes a sine wave form to be generated as the opaque area passes across the transparent area blocking the light from the photo-sensor.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A high accuracy optical shaft encoder system, comprising an electrically powered motor having a rotating shaft; optical shaft encoder means for measuring the rotation speed of the shaft and providing an electrical output having a waveform indicative of said rotational speed; means for multiplying the waveform by a predetermined factor; means connected to said multiplying means for converting the wave forms to a logical binary waveform; means for generating a standard reference signal of known waveform characteristics; means for receiving said logical binary waveform and said reference wave form, comparing the waveforms indicative of the difference between the waveforms, and means for converting the difference signal to a control voltage connected between the signal comparing means and the electrically powered motor.

2. A high accuracy optical shaft encoder system according to claim 1 wherein said means for multiplying includes an integrated multiplier circuit.

3. A high accuracy optical shaft encoder system according to claim 1 wherein said means for multiplying includes a plurality of integrated multiplier circuits.

4. A high accuracy optical shaft encoder system according to claim 1 wherein, the means for receiving said waveforms is a comparator.

* * * * *